United States Patent [19]

Fabian

[11] 3,983,950

[45] Oct. 5, 1976

[54] MOBILE CRUSHING PLANT

[75] Inventor: Horst Fabian, Rheinhausen, Germany

[73] Assignee: Fried. Krupp Gesellschaft mit beschrankter Haftung, Essen, Germany

[22] Filed: Apr. 18, 1974

[21] Appl. No.: 462,121

[30] Foreign Application Priority Data

Apr. 21, 1973 Germany............................ 2320487

[52] U.S. Cl. ................................ 180/24; 180/44 F; 180/41; 280/43.24; 280/43.23; 241/101.7

[51] Int. Cl.[2] ......................... B60S 9/10; B60K 7/00

[58] Field of Search ............... 180/44 F, 66 R, 66 F, 180/45, 24; 241/101.7; 280/43.23, 43.24

[56] References Cited

UNITED STATES PATENTS

| | | | |
|---|---|---|---|
| 2,648,546 | 8/1953 | Falkenhagen | 280/43.24 X |
| 2,908,241 | 10/1959 | Todd | 280/43.23 |
| 3,154,164 | 10/1964 | Shaw et al. | 180/44 F |
| 3,436,095 | 4/1969 | Preston | 280/43.23 X |
| 3,510,073 | 5/1970 | Mailliard | 241/101.7 X |
| 3,528,675 | 9/1970 | Brown | 280/43.23 |
| 3,563,477 | 2/1971 | Schroeder | 241/101.7 |
| 3,664,448 | 5/1972 | Hudis | 180/45 |
| 3,749,201 | 7/1973 | Clarke | 280/43.24 |
| 3,788,444 | 1/1974 | McWilliams | 180/44 |
| 3,848,817 | 11/1974 | Vaillant et al. | 241/101.7 |

*Primary Examiner*—Kenneth H. Betts
*Attorney, Agent, or Firm*—Walter Becker

[57] ABSTRACT

A crushing implement on rubber tire equipped wheels in which the understructure of the implement can selectively be lifted off the ground hydraulically while resting on the wheels or can be rested on the ground, preferably at three points, while the wheels are lifted off the ground. The implement is equipped with hydraulic pump means for supplying the driving fluid for driving at least some of the wheels and also for supplying actuating fluid to hydraulic cylinder-piston systems for lifting and lowering the understructure, and if desired also to conveyor means for feeding material to be crushed to the crusher rollers of the crushing implement.

3 Claims, 14 Drawing Figures

FIG. 6
FIG. 6a
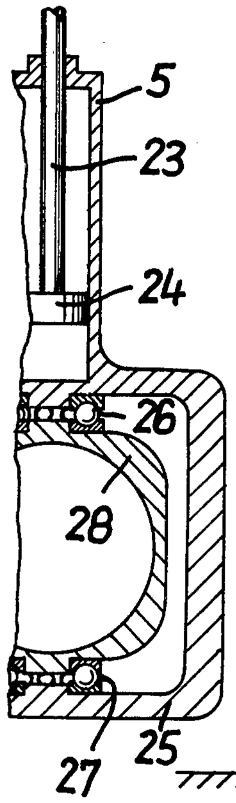
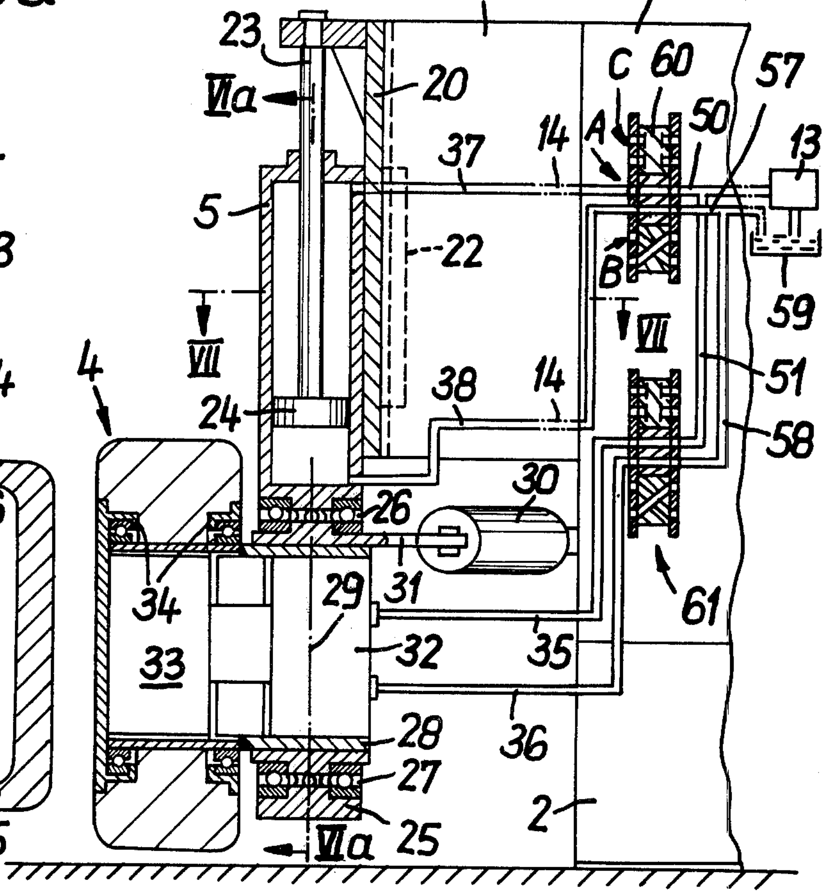
FIG. 7
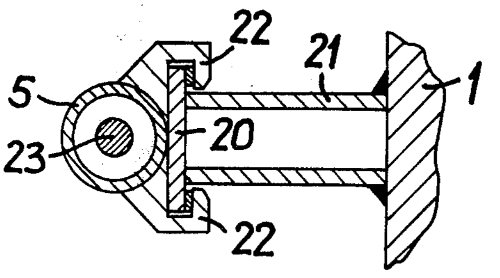

MOBILE CRUSHING PLANT

The present invention relates to a crushing plant. In order to obtain a high output in quarries, it is not only necessary to utilize correspondingly effective crushing machinery but it is also necessary that such correspondingly heavy machinery and devices can be moved in the shortest time possible within an extensive open pit mining to the respective mining area.

It is an object of the present invention to provide a high output crushing plant or implement which will meet the above mentioned requirements so as to permit a highly economic crushing operation.

These and other objects and advantages of the invention will appear more clearly from the following specification in connection with the accompanying drawings, in which:

FIG. 6 illustrates on a considerably larger scale than FIG. 2 a section along the line VI—VI of FIG. 2.

FIG. 6*a* is a section taken along the line VIa—VIa of FIG. 6.

FIG. 7 is a section taken along the line VII—VII of FIG. 6.

Figure 8:
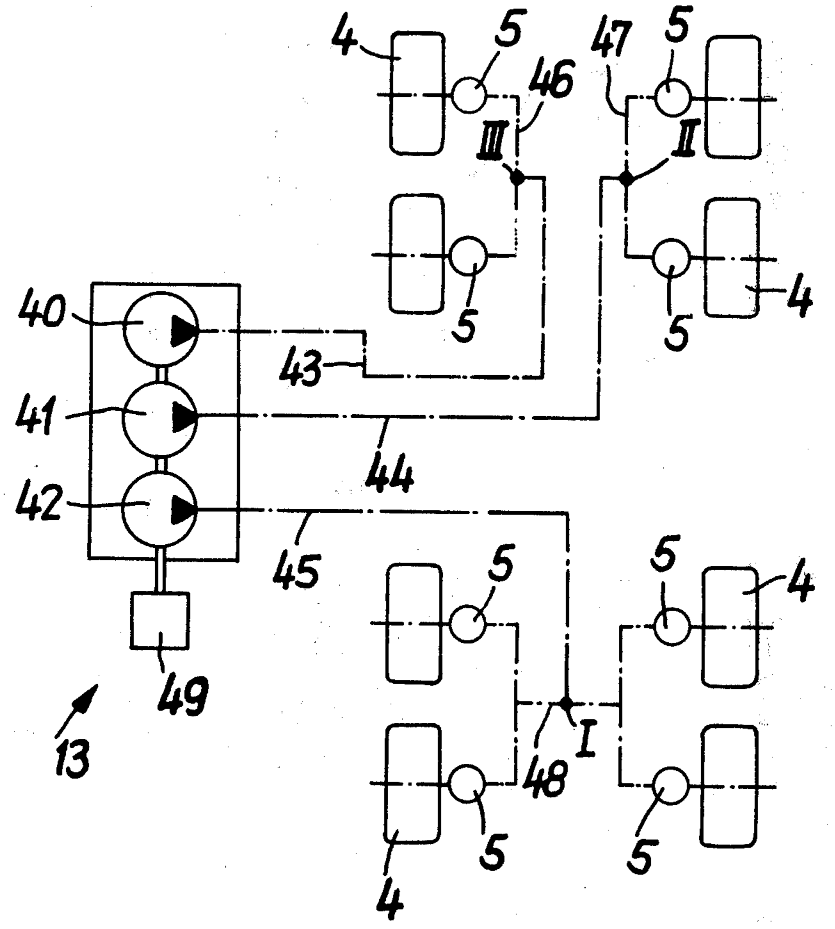

FIG. 8 diagrammatically shows an arrangement which will bring about the movements of the cylinder-piston systems will with all hydraulic power systems be effected uniformly.

Figure 9:
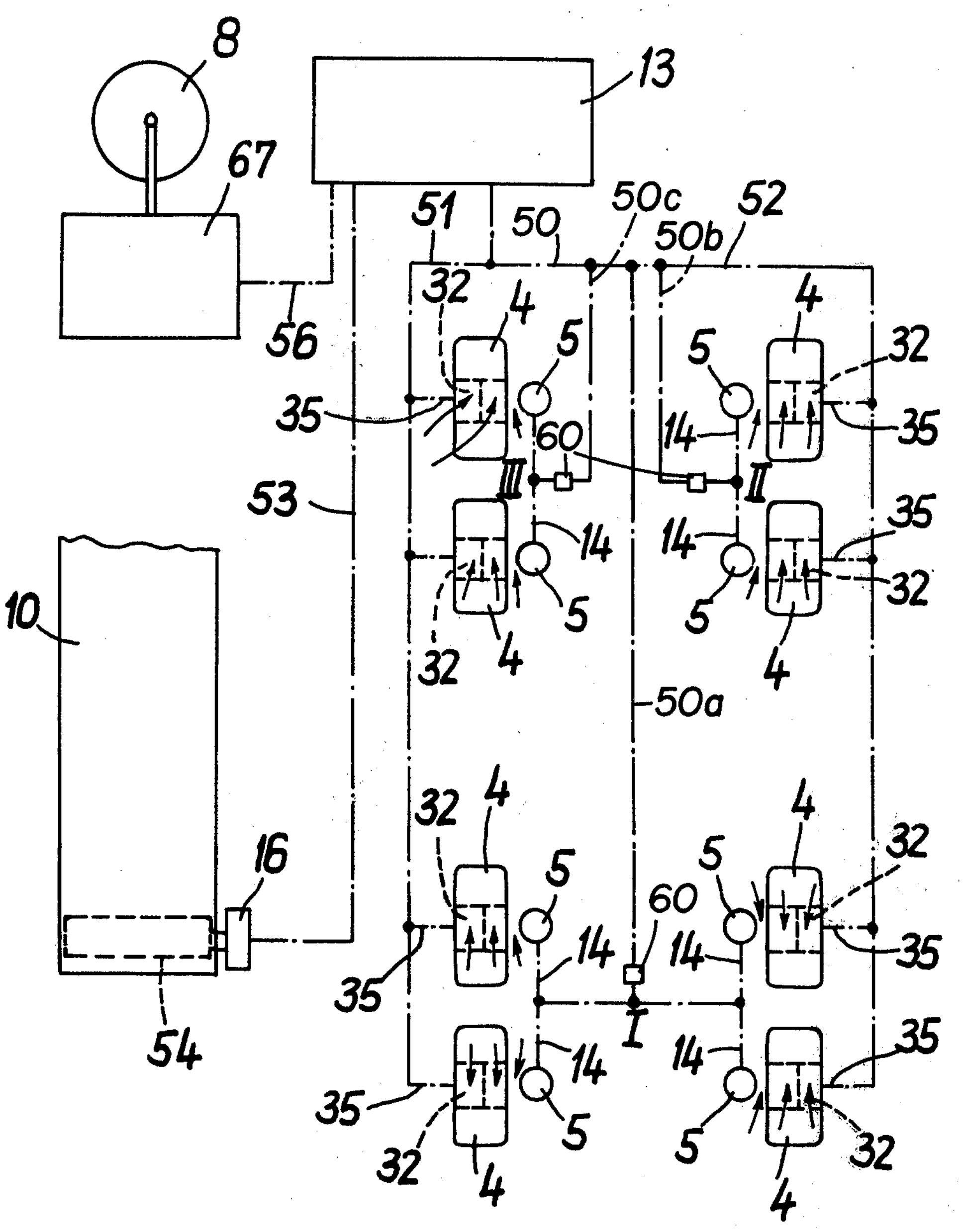

FIG. 9 illustrates the supply of pressure fluid required for driving the wheels.

Figure 10A:
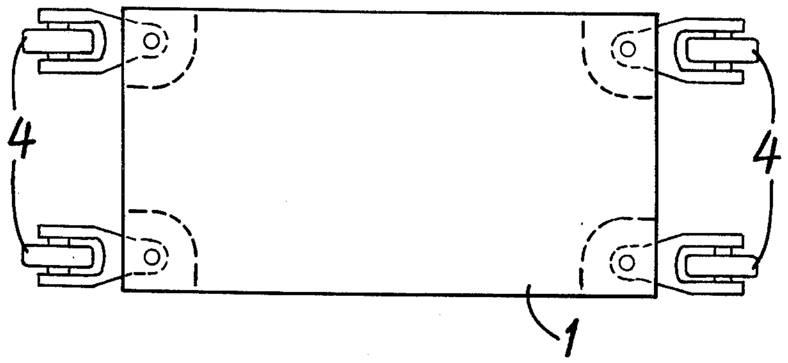
Figure 10:
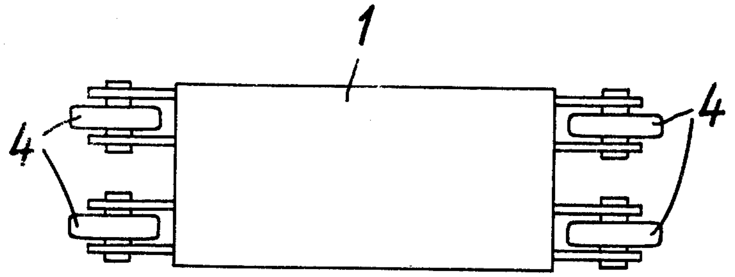

FIG. 10 illustrates a modification, according to which the rubber tire equipped wheels on the transverse sides of the understructure instead of or in addition to wheels can be provided on the longitudinal sides of the understructure.

FIG. 10*a* shows the wheels pivoted on the transverse sides and arranged on parallel lines.

Figure 10B:
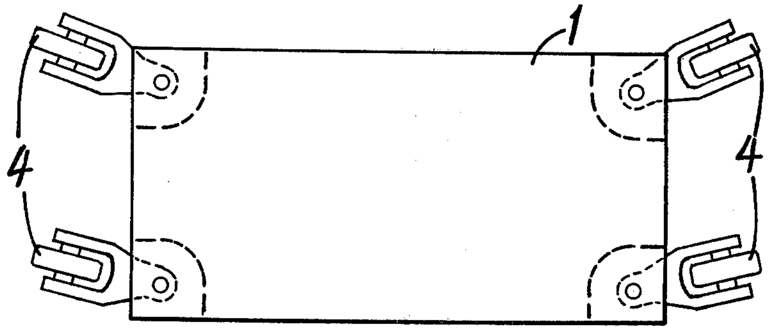

FIG. 10*b* shows the wheels pivoted on the transverse sides and arranged on concentric circles.

Figure 11:
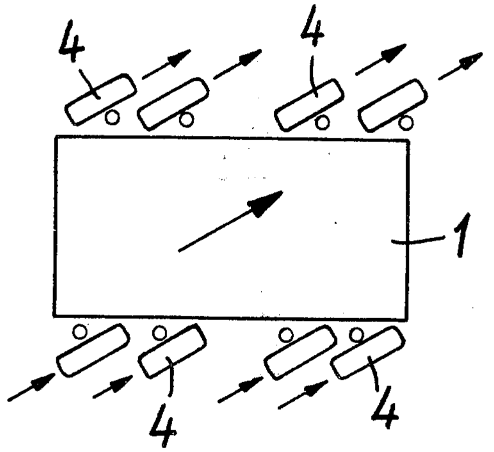

FIG. 11 shows an arrangement according to which the wheels are so pivoted that a so-called dog-walk (hundegang) is effected with which all wheels being parallel to each other are positioned at an angle with regard to the longitudinal axis of the understructure.

Figure 3:
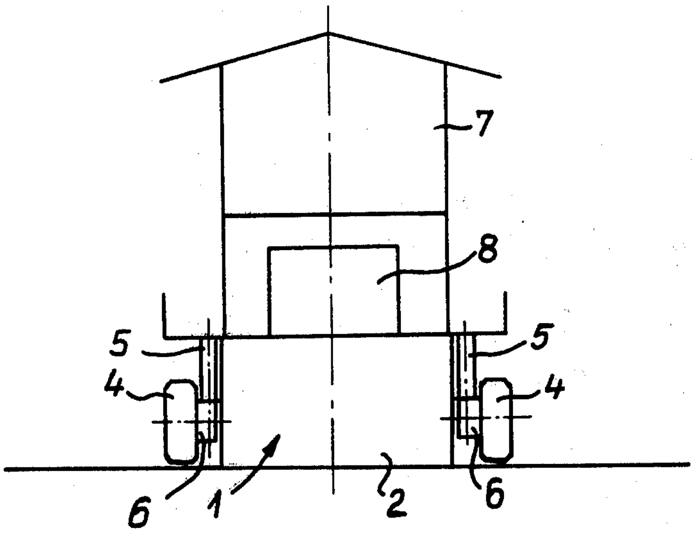
FIG. 3 represents an end view of the crushing implement during crushing operations.
Figure 4:
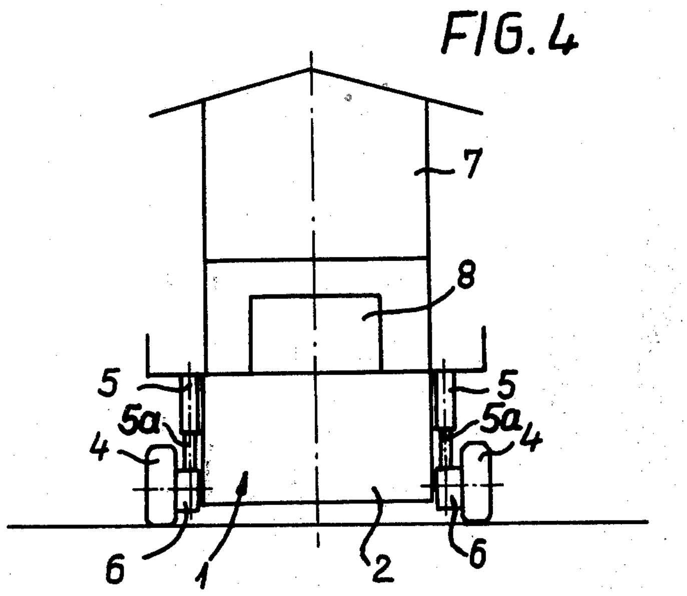
FIG. 4 is an end view of the crushing implement in driving condition.

Referring now to the drawings in detail, the understructure 1 has a U-shaped contour and on the charging side is provided with a foot portion 2 which extends over the width of the understructure. At the discharge side, the understructure 1 is provided with two foot portions 3. Arranged on each of the two sides of the understructure 1 are two pairs of wheels 4 with rubber tires. These wheels are vertically displaceably guided on the understructure 1. The lifting and lowering of the wheels 4 relative to the understructure 1 or of the understructure relative to the wheels is effected by means of double acting hydraulic power operable devices the cylinders 5 of which rest on the understructure 1 while the connecting rods 5*a* pertaining to said cylinders 5 rest on the axle supports 6 of the wheels 4 (FIGS. 3 and 4). Some or all rubber tire equipped wheels 4 are equipped with hydraulic individual drives and transmissions. For purposes of steering, the wheels 4 are pivotable in the manner illustrated in FIG. 5. In certain circumstances it will suffice if only some of the wheels are pivotable for steering purposes.

An arrangement which is the reverse of the above described embodiment is shown in FIGS. 6 to 8. According to FIGS. 6 to 8, one of the cylinders 5 of the hydraulic power devices is slidably guided along a vertical wall 20 of an extension 21 of the understructure 1. This is effected by mens of jaw-shaped strips 22 (FIG. 7) which extend around the wheels which protrude in a flange-like manner and are arranged at the wall 20. The connecting rod 23 of the piston guided in cylinder 5 extends through a stuffing box in the upper end face wall of the cylinder and has its upper end connected to a bracket of the extension 21. Cylinder 5 continues downwardly in a frame 25 within which by means of an upper and lower ball turntable 26, 27 respectively there is journalled the hollow shaft 28 of one of the wheels 7 for pivotal movement about a vertical axis 29. The pivoting of wheel 4 is effected by means of a hydraulic power operable device the cylinder 30 of which is pivotally connected to the understructure 1 while its connecting rod is pivotally connected to a lever 31 on frame 25. In the interior of the hollow shaft 28 there are mounted a hydraulic driving motor 32 and a transmission 33 which conveys the driving energy to the wheel 4 which in turn by means of ball bearings 34 is journalled on shaft 28. Connected to the motor 32 are conduits 35, 36 for feeding and withdrawing liquid. Conduits 37, 38 are connected to the upper and lower end of the cylinder 5 for feeding and withdrawing liquid. According to FIG. 6, the cylinder 5 is lifted to the illustrated position by means of pressure fluid which is inroduced into the cylinder chamber above piston 24 through conduit 37 while liquid from the lower cylinder chamber passes through conduit 38. In this way, the wheel 4 is lifted off the ground while the lower structure 1 by means of its legs 2, 3 rests on the ground.

Figure 5:
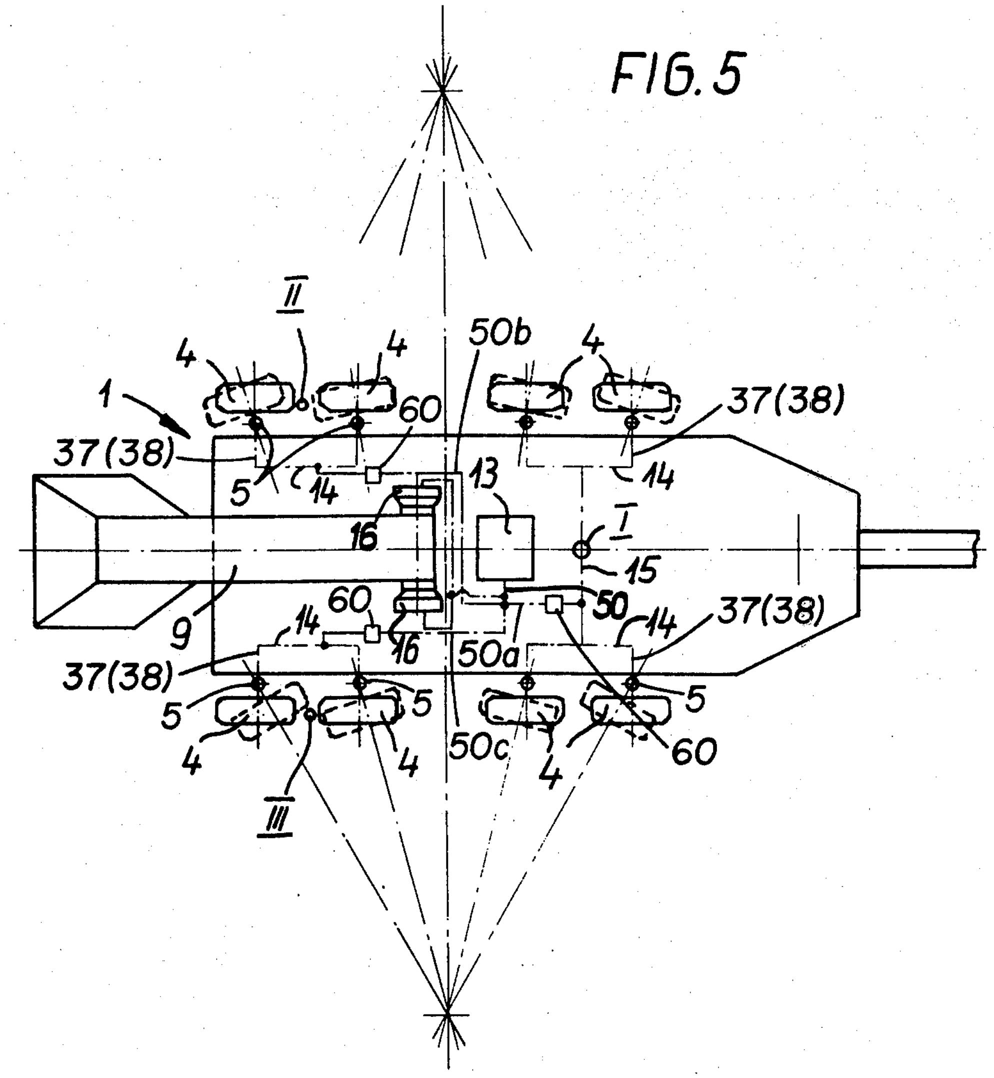
FIG. 5 is a top view of a crushing implement according to the invention illustrating further details of the crushing implement.

Some or all rubber tire equipped wheels 4 have a hydraulic drive as shown for instance in FIG. 6. FIG. 5 illustrates that all wheels 4 are pivotable for steering purposes. Under some circumstances it will suffice that only some of the wheels are pivotable for steering purposes.

Mounted on the understructure 1 are structures 7 of the crushing installation with the crusher 8 which may be of any desired standard type. The charging belt conveyor is designated with the reference numeral 9 and the discharging belt conveyor is designated with the reference numeral 10. Adjacent thereto and provided on the understructure 1 is a funnel 11 for transferring the material to be crushed onto a conveyor belt 12 which is pivotable about a vertical axis.

The pressure fluid for the hydraulic power operable devices 5 is furnished by a pump unit 13 which is mounted on the understructure 1. As shown in FIG. 5, on each side of the understructure 1, the wheels 4 are in pairs combined to hydraulic units inasmuch as the cylinder 5 of each two hydraulic power operable devices are interconnected through equalizing conduits 14 through the connecting conduits 37, 38 (FIG. 6). Furthermore, the conduits 14 of two wheel pairs 4 arranged on opposite sides of the understructure are interconnected by equalizing conduits 15 connected through conduit 50*a* to conduit 50, which connects to pump unit 13. Equalizing conduits 14 for the other two wheel pairs are connected to conduit 50 by separate conduits 50*b* and 50*c*, respectively. A control device is connected in each of the conduits 50*a*, 50*b* and 50*c* to control hydraulic devices 5 (See FIG. 6).

Figure 1:
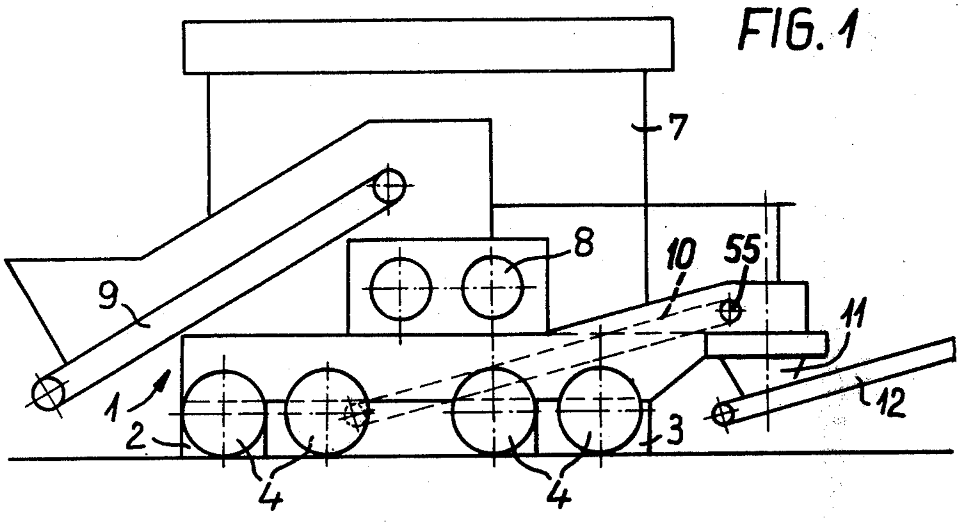
FIG. 1 illustrates a side view of a movable high output crushing implement during its crushing operation.
Figure 2:
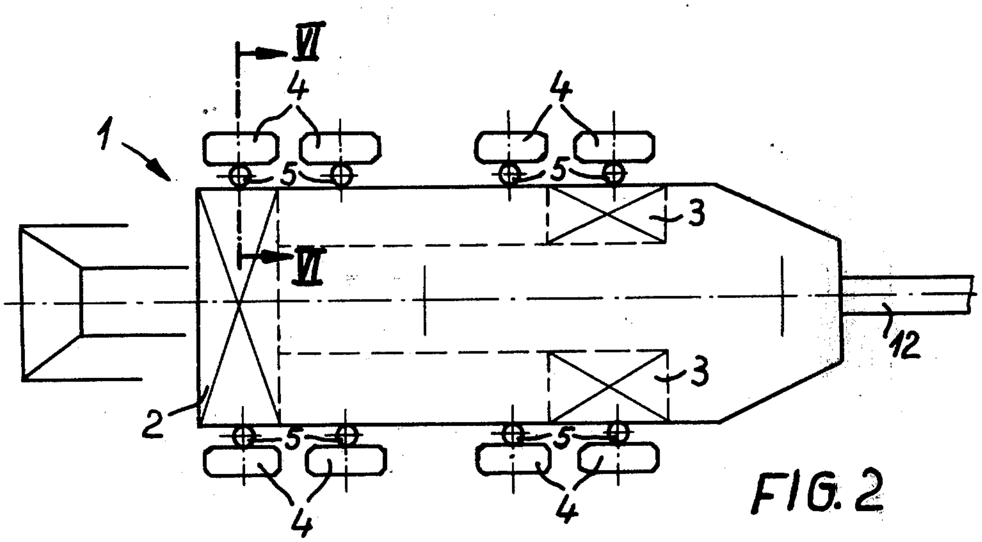
FIG. 2 is top view of FIG. 1.

During the crushing operation, the understructure 1, as shown in FIGS. 1, 3 and 6, is placed upon the ground, and the rubber tire equipped wheels 4 are lifted off the ground by means of the hydraulic power operable devices 5. Consequently, the shocks caused by the crushing work are conveyed through the understructure 1 directly into the ground without exerting stresses upon the wheels 4, the bearings therefor and the hydraulic power operable devices.

When the crushing installation is intended to change its place, the wheels 4 are by means of the hydraulic power operable devices 5 lowered onto the ground, and the understructure 1 is then lifted off the ground as shown in FIG. 4. By suitable means it will be brought about that the movements of the cylinders 5 and connecting rods 5*a*, 23 relative to each other will be effected uniformly with all hydraulic power operable devices. FIG. 8 illustrates an exemplary embodiment therefor. According to FIG. 8, three pumps 40, 41 and 42 are provided, and each of these pumps is by means of a pressure fluid conveying conduit 43, 44, and 45 respectively connected to an equalizing conduit 46, 47 and 48 respectively through which the cylinders 5 of four groups are connected to each other to form the three supporting points I, II and III. The pumps 40, 41 and 42 have a common drive comprising a motor 49 so that they will automatically deliver equal quantities of liquid per time unit.

FIG. 9 further illustrates that the pump unit 13 furnishes the pressure fluid required for driving the wheels 4. According to FIG. 9, not only the conduit 50 originates at the pump unit 13 which conduit 50 has connected thereto the equalizing conduits 14 (FIG. 5), but at the pump unit 13 additionally originate two conduits 51, 52 from which branch off the connecting conduits 35 for the driving motors 32. Furthermore, a pressure fluid conveying conduit 53 leads from the pump unit 13 to a hydraulic motor 16 by means of which the reversing drum 54 of the discharging belt 10 may be driven. This is effected when during the crushing operation neither the cylinders 5 nor the motors 32 require pressure fluid. In such an instance, also the crusher 8 can receive its driving energy from the pump unit 13. To this end, a conduit 56 leads from the pump unit 13 to a hydraulic motor 67 for delivering pressure fluid for the drive of the crusher 8.

Each of the pressure fluid conveying conduits 43, 44, 45, 50–53, 56 has associated therewith a return conduit. For instance FIG. 6 shows that the conduits 50 and 51 have associated therewith parallel return conduits 57 and 58 respectively which end above a fluid collecting container 59. Interposed between the conduits 50 and 57 is the control device or two-way valve 60 by means of which, as illustrated, an equalizing conduit 14 pertaining to the conduit 37 is connected to the conduit 50, and an equalizing conduit 14 pertaining to the conduit 38 is connected to the conduit 57. To this setting designated with A corresponds the lifting of the cylinder 5. By changing of the two-way valve 60 so that the latter occupies its position B, the connection between conduit 37 and 57 as well as between the conduits 38 and 50 is established. This corresponds to the lowering of the cylinder 5 and the lifting of the understructure 1. In a third position C of the valve 60, the conduits 37 and 38 are blocked so that the cylinder 5 is held in its respective position of height relative to the understructure 1. In a corresponding manner, between conduits 35, 36 and conduits 51, 58 a two-way valve 61 is interposed by means of which the driving direction of the motor 32 can be reversed.

In some instances it may be advantageous to arrange the rubber equipped tires in addition to placing them on the longitudinal sides of the understructure or instead thereof, on the transverse sides of the understructure as shown in FIG. 10 and may be pivoted individually as in FIG. 10*a*. If necessary, the rubber equipped wheels may also be so pivoted that a so-called "dog walk" is realized at which all wheels extend at an incline with regard to the longitudinal axis of the understructure and parallel to each other as shown in FIG. 11 or may be positioned on concentric circles as in FIG. 10*b*.

As will be evident from the above, the invention brings about the advantage that on one hand the crushing implement can in a minimum of time and in a considerably shorter time than was heretofore possible with crushing implements equipped with stepping machanisms or track-laying means change its place of operation even over considerable distances. Furthermore with a crushing implement according to the present invention, the shocks and vibrations occurring during the crushing operation will not affect the rubber tire equipped wheels nor the hydraulic power operable devices.

It is, of course, to be understood that the present invention is, by no means, limited to the specific showing in the drawings but also comprises any modifications within the scope of the appended claims.

What I claim is:

1. A crushing implement which includes in combination: an understructure having foot portions rigidly connected to it with bearing surfaces adapted to immediately rest upon the ground;

a. a plurality of wheels associated with said understructure and operable selectively to support said understructure for moving said crushing implement to any desired place;

b. the axle supports of said wheels are connected to said understructure by means which transmit forces in horizontal directions between said axle supports and said understructure but which permit movements of said axle supports relative to said understructure in nearly vertical direction;

c. double acting hydraulic power devices interposed between said axle supports and said understructure and provided with control means in such a manner that by means of said hydraulic power devices on the one hand when said control means are adjusted into one position said understructure will be lowered as far as said foot portions rest upon the ground while said wheels are lifted off the ground and on the other hand when said control means are adjusted into another position said axle supports will be lowered as far as said wheels rest upon the ground while said understructure is lifted off the ground;

d. a source of pressure fluid is connected to said hydraulic power devices by fluid conveying conduit means, said wheels being subdivided into three groups and the power devices which pertain to the wheels of each group being interconnected through equalizing conduits each of three separate conduits connecting said source of fluid to the equalizing conduit of one of said groups of wheels thus realizing a three point support of said understructure upon said wheels when the latter are resting upon the ground;

e. equalizing means associated with said hydraulic power devices for obtaining uniform stroke conditions of said hydraulic power devices;

f. driving means operatively connected to at least some of said wheels;

g. steering means operatively connected to at least some of said wheels for selectively steering the same.

2. A crushing implement in combination according to claim 1, which includes pump means and conduit means leading from said pump means to said fluid operable means for supplying said fluid operable means with actuating fluid.

3. A crushing implement in combination according to claim 2, in which said driving means include fluid operable motor means, and means for supplying actuating fluid from said pump means to said fluid operable motor means for driving the same.

* * * * *